(12) United States Patent
Vaske et al.

(10) Patent No.: US 7,313,905 B2
(45) Date of Patent: Jan. 1, 2008

(54) FOLDING IMPLEMENT FRAME

(75) Inventors: Michael Vaske, Knoxville, IA (US); Michael Kindley, Oskaloosa, IA (US); Philip Egging, Reasnor, IA (US)

(73) Assignee: Vermeer Manufacturing Company, Pella, IA (US)

( * ) Notice: Subject to any disclaimer, the term of this patent is extended or adjusted under 35 U.S.C. 154(b) by 189 days.

(21) Appl. No.: 11/161,594

(22) Filed: Aug. 9, 2005

(65) Prior Publication Data
US 2007/0033915 A1    Feb. 15, 2007

(51) Int. Cl.
*A01D 76/00*    (2006.01)
*A01D 78/00*    (2006.01)
*A01D 80/00*    (2006.01)
*A01D 84/00*    (2006.01)

(52) U.S. Cl. ........................................... 56/379
(58) Field of Classification Search ................. 56/365, 56/370, 385, 396, 380, 384, 379, 397
See application file for complete search history.

(56) References Cited

U.S. PATENT DOCUMENTS

| 5,062,260 | A | * | 11/1991 | Tonutti | ........................ | 56/380 |
| 5,493,853 | A |   | 2/1996  | Tonutti |                          |        |
| 5,540,040 | A | * | 7/1996  | Peeters | ........................ | 56/377 |
| 5,542,190 | A | * | 8/1996  | Wahls   | ........................ | 33/624 |
| 5,752,375 | A |   | 5/1998  | Tonutti |                          |        |
| 5,899,055 | A | * | 5/1999  | Rowse et al. | ................. | 56/377 |
| 6,945,024 | B2| * | 9/2005  | Tonutti | ........................ | 56/377 |
| 7,007,450 | B2| * | 3/2006  | Tonutti | ........................ | 56/377 |

* cited by examiner

*Primary Examiner*—Árpád Fábián Kovács
(74) *Attorney, Agent, or Firm*—Sturm & Fix LLP

(57) ABSTRACT

A folding frame for a drawn implement such as a hay rake is disclosed. The frame includes cushion fold cylinders, a lift cylinder, and a windrow width cylinder. The lift arms actuated by the lift cylinder lift the frame wings and engage a selector valve, providing an open circuit to either the fold cylinder or the windrow width cylinder, or both. During folding, when the cylinders reach the cushion region of their stroke, the pressure in the hydraulic circuit increases, resulting in a change in the force applied to the selector valve by the lift arm. By careful adjustment, this change in pressure will adjust the selector valve so the hydraulic circuit is open to both the fold and windrow width cylinders. Consequently, the windrow width cylinders extend, keeping the frame wings from colliding with the main frame.

3 Claims, 15 Drawing Sheets

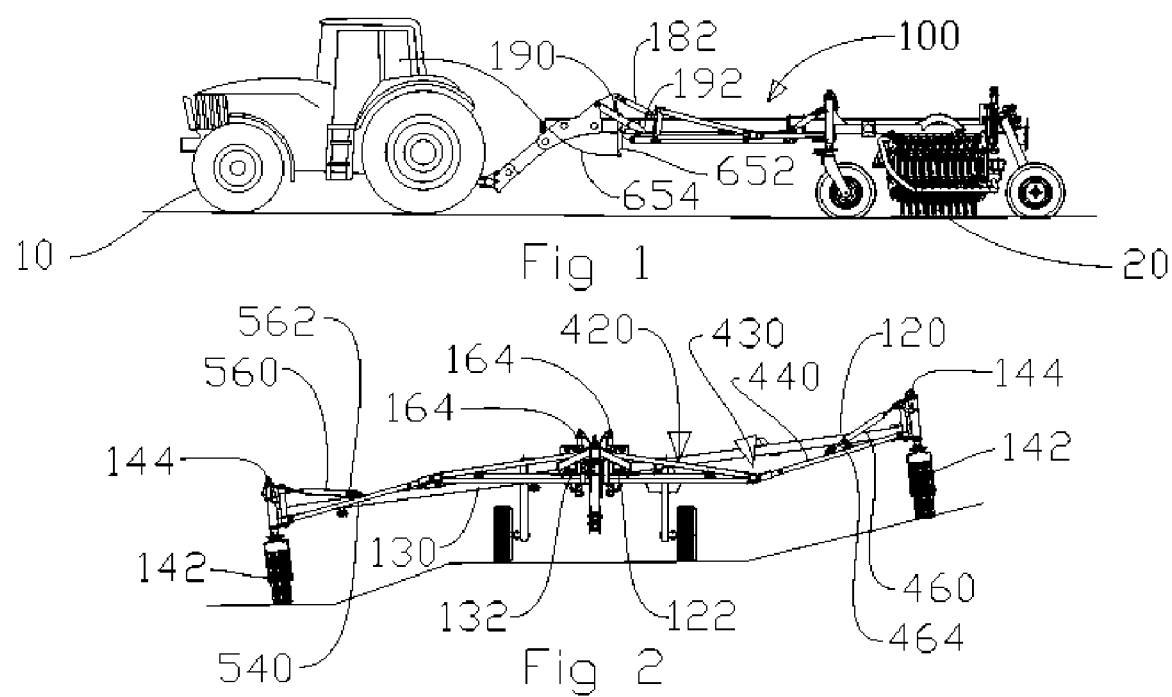

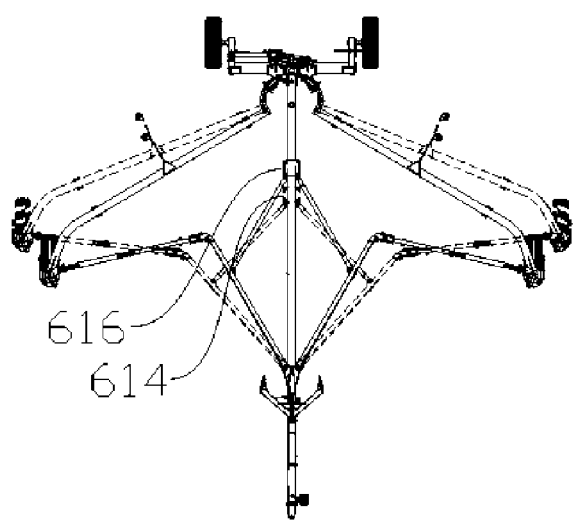
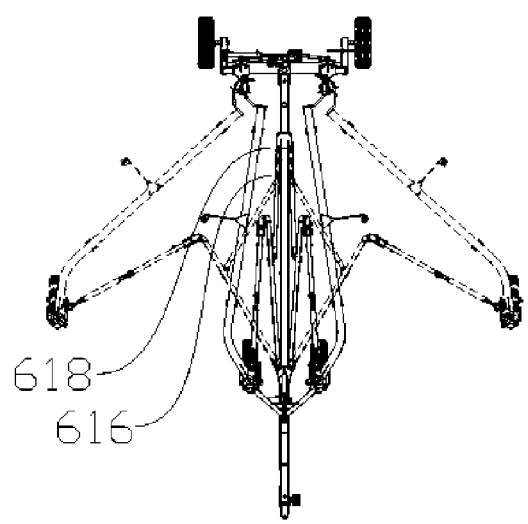
Fig 10
Fig 12

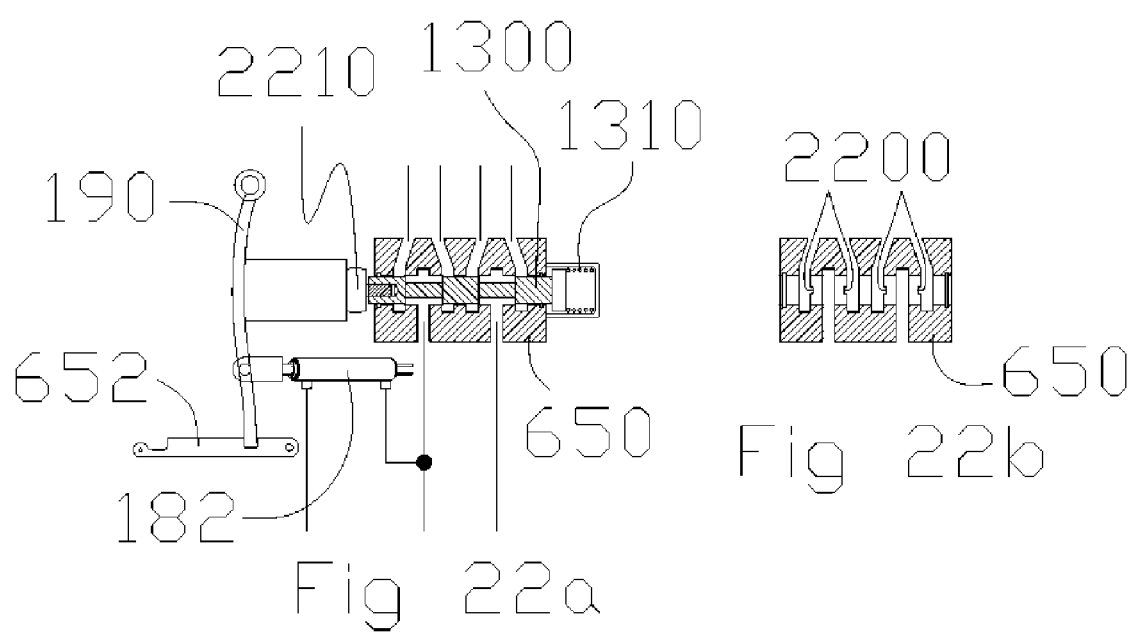

FOLDING IMPLEMENT FRAME

FIELD OF THE INVENTION

The present invention relates generally to agricultural equipment, and more specifically to a folding frame for an agriculture implement such as a twin basket rake.

BACKGROUND

The process of baling agricultural crops starts when the crop is cut or mowed and laid onto the ground in an arrangement to aid drying. After reaching an initial dried condition, the process typically includes a raking step where the crop is formed into a windrow to enhance the final drying process. Since the capacity of balers is affected by the form and size of the final windrow, the raking process is also used to arrange the crop into a windrow that is optimized for baling.

The raking process often involves collecting the crop material over a wide swath to increase the density of the crop in the final windrow of an adjustable width. It is common to use twin rakes, including left and right side rakes that move material toward the center, thereby efficiently forming the desirable final windrow.

The frame that carries the side rakes of a wide twin rake must provide adequate flotation to allow the raking elements to follow variations in the terrain. They also need to position the raking baskets to provide varying windrow widths and to move between a folded transport configuration and an extended operating configuration; the frames thus typically include a folding linkage, a windrow width linkage, and a lift linkage.

Present day folding rakes require manual operations for folding. Manual folding is inconvenient, requires that the rake be placed on nearly level, smooth ground, and necessitates some strength. A small, ill, or injured operator may not be able to provide the forces needed to fold the rake on some terrain.

Therefore, there is a need for a folding rake frame wherein only a single hydraulic source is used for the folding operation, and wherein the operator may carry out the folding from the tractor seat.

SUMMARY

An object of the present invention is to provide a folding farm implement frame having rear pivots that support a rear-end of frame wings to provide an adjustable width between the frame wings, front support structure that supports a front-end of the frame wings to provide the capability fold the wings by positioning the frame wings parallel to the tongue for transport, and a lift operation to carry the weight of the wings during transport. Another object is to carry out all the above operations with a single hydraulic source. Still another object of the invention is to carry out all the above operations from the tractor seat. An additional object is to provide folding wherein the sequencing of the width between the rear pivots and folding is accomplished automatically.

The folding frame of the present invention includes a folding linkage that securely and rigidly holds rake baskets in an operating position while allowing adequate flotation to follow the terrain during operation.

The folding linkage further includes a hydraulic circuit comprising a novel cylinder that provides for controlled and acceptable folding, minimizes requirements for the operator to control the folding, and allow the operator to fold the frame entirely from the tractor, without needing to manually move any of the raking elements.

The hydraulic circuit of the present invention further includes coordination of the all the frame movements including folding, width between frame wings or windrow width, and wing lift so that all these functions are actuated by a single hydraulic source. In one embodiment for a basket rake, the power required to rotate the raking baskets during the raking operation can be provide by a second hydraulic source, so that the rake may be operated using a tractor with two remote hydraulic circuits.

BRIEF DESCRIPTION OF THE DRAWINGS

FIG. 1 is a side elevation view of the rake frame of the present invention with the rake in an operating position;

FIG. 2 is a front elevation view of the rake frame as it would sit on variable terrain;

FIG. 10 is a top plan view showing the frame in phantom in a position where the fold cylinder is one half extended, and also in a position where the fold cylinder is three fourths extended;

FIG. 12 is a top plan view showing the frame in phantom in a position where the fold cylinder is three fourths extended, and also in a position where the fold cylinder is fully extended;

FIG. 17b is a detail view of an axis of rotation for one folding arm;

FIG. 22*a* is a is a schematic of the selector valve; and

FIG. 22*b* is a schematic of the selector valve showing channels permitting flow to both ports when the spool is centered between the two ports.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 3:
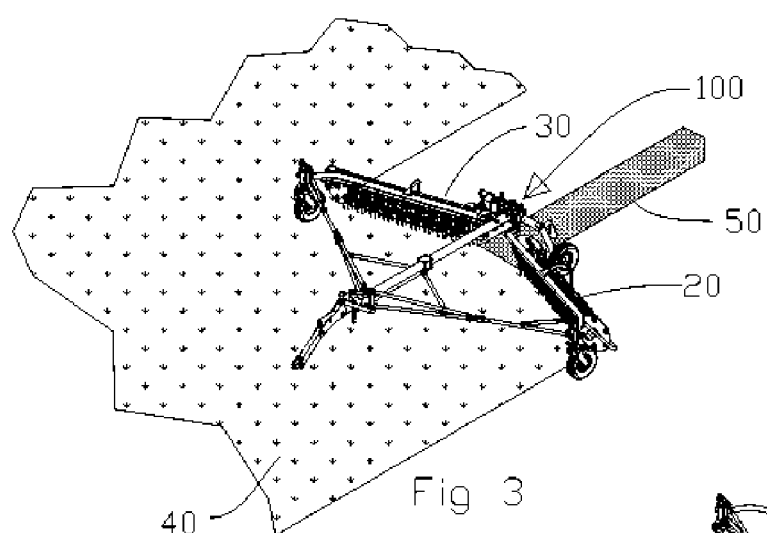
FIG. 3 is an isometric view showing the rake in an operating position.

A twin rake, with elements of the present invention, is illustrated in FIG. 1, in an operating configuration and includes a left raking basket 20 and a folding frame 100. The rake is towed by a towing vehicle such as the tractor 10 shown in FIG. 1. In FIG. 3, the rake is illustrated with the folding frame 100 supporting the left raking basket 20 and a right raking basket 30 in operating positions to move a mowed crop 40 into a formed windrow 50, as the rake is pulled across a field. The raking baskets 20, 30, consisting of parallel bars supporting and propelling spring teeth to contact and move the crop material 40, are well known. The present invention is not limited to parallel bar basket rakes, as the folding frame 100 could be used to support and position other types of raking elements, such as ground driven rake wheels. Other farm implements other than a rake may also be mounted on the folding frame 100 of the present invention.

Figure 4:
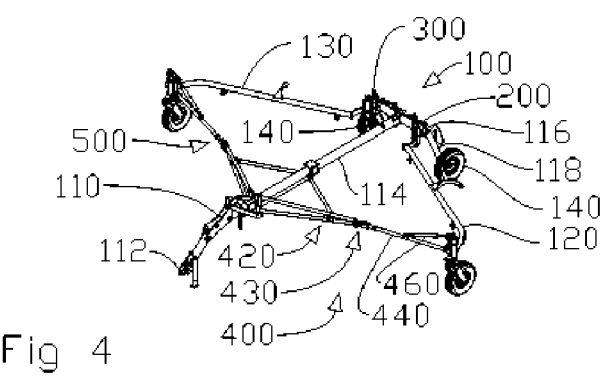
FIG. 4 is a partial isometric view showing the rake frame in operating position similar to that shown in FIG. 3.

The folding frame 100 is shown in more detail, with the baskets 20, 30 removed, in FIG. 4 including a T-shaped main frame 110 with a hitch 112 at the front, configured to attach to and be supported by the drawbar of a tractor 10, a longitudinal center section 114 and a transverse rear section 116. Wheel arms 118 fixedly attached to the rear section 116 extend vertically to a spindle and wheel 140 on each side of the rear section 116, which cooperate with the hitch to support the main frame 110 at a fixed height from the ground.

Figure 6:
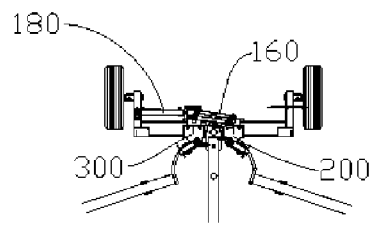
FIG. 6 is a top plan view showing a windrow width in a narrow position.
Figure 7:
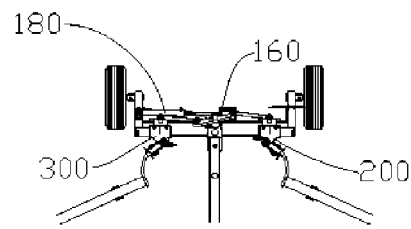
FIG. 7 is a top plan view showing the windrow width in a wide position.
Figure 11:
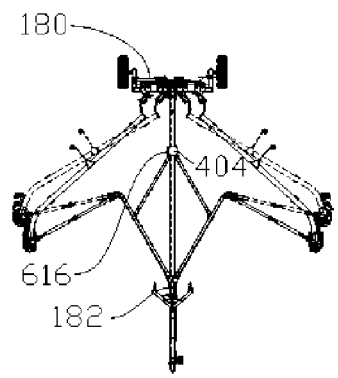
FIG. 11 is a top plan view showing the frame in phantom in a position where the fold cylinder is three fourths extended and the windrow width in its minimum position, and also in a position where the fold cylinder is three fourths extended and the windrow width in its maximum position.
Figure 14:
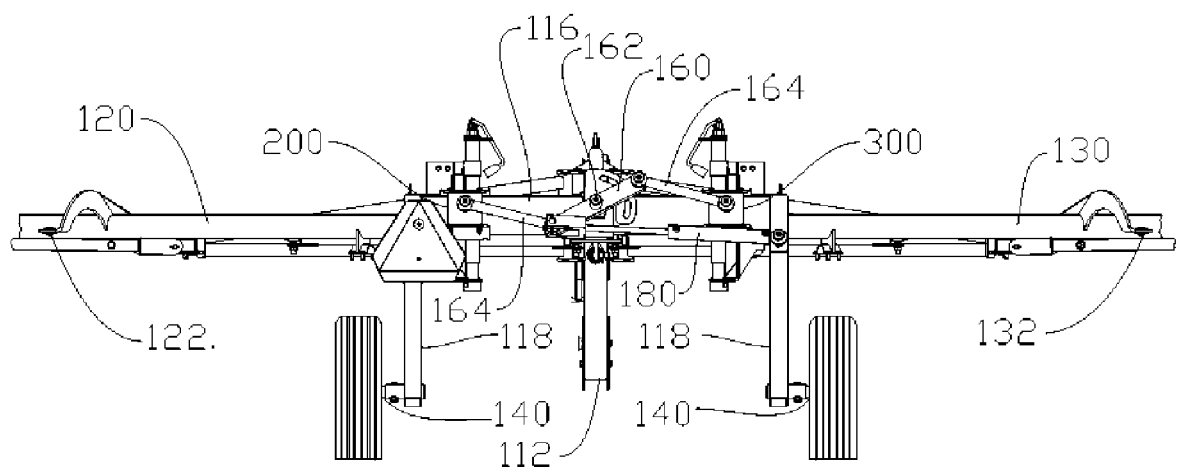
FIG. 14 is a rear elevation view of the rake frame.

The twin rake further includes a left wing or rake arm 120 and a right wing or rake arm 130, both pivotally attached at the rear section 116 of the main frame 110. The left rake arm 120 is attached at a left slider 200, and the right rake arm 130 is pivotally attached a right slider 300, shown in greater detail in FIG. 14. A wing spacing or windrow width link 160 is pivotally mounted to the main frame at a pivot 162. The left slider 200 and the right slider 300 are attached to the windrow width link 160 by link arms 164 such that they are positioned an equal distance from the pivot 162. As the windrow width cylinder 180, pivotally attached to the windrow width link 160 and the main frame 110, extends, the distance between the left slider 200 and the right slider 300 increases, and therefore the distance between the left rake arm 120 and the right rake arm 130. The windrow width link 160 is shown in its two extreme positions: with the cylinder 180 fully retracted shown in FIG. 6 and with the cylinder 180 fully extended shown in FIG. 7.

Figure 15:
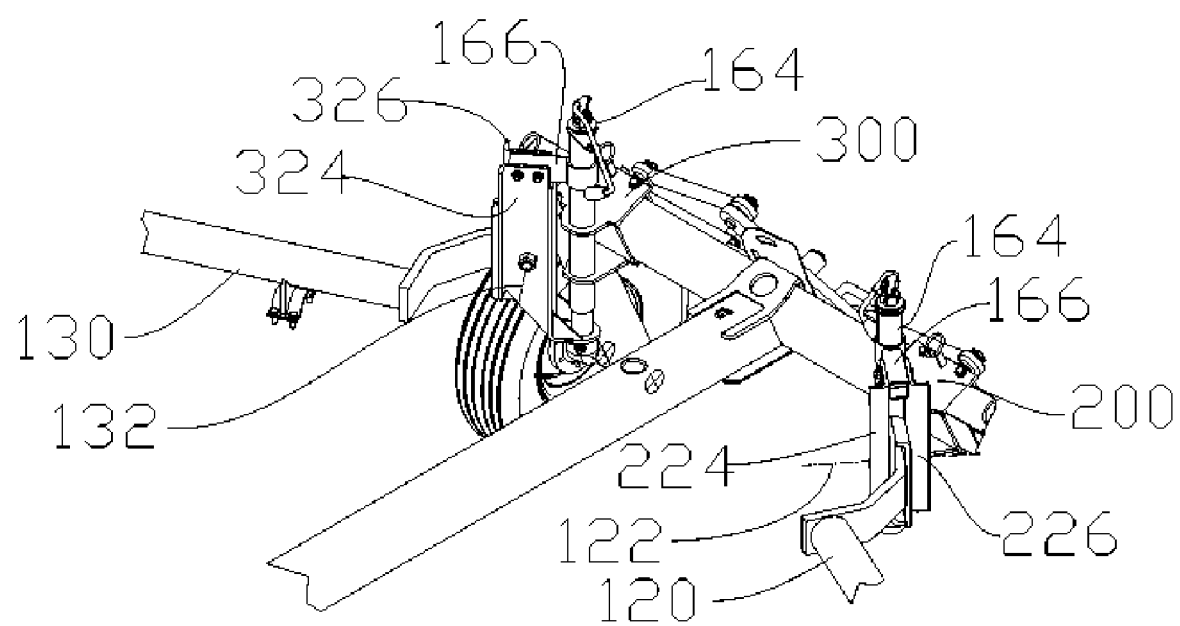
FIG. 15 is a detail view of the center of the rake frame.

FIG. 15 illustrates the slider 300 in more detail including a first horizontal pivot 132 defined by aligned apertures in mating plates 324, 326, and a second horizontal pivot 122 defined by aligned apertures in mating plates 224, 226. These horizontal pivots 132, 122 allow the rake arms 120, 130 to move in a vertical plane as necessary to allow flotation of the outer wheels 142 that support the outer ends of the rake arms 120,130, to follow variations in the terrain as illustrated in FIG. 2. The sliders 200, 300 each further include a cylindrical jack 164 that allows an operator to move the horizontal pivots 132,122 vertically, in order to control the height of the inner end of each rake arm 120,130.

FIG. 15 further illustrates the mating plates 324, 326 and 224, 226 connected to a pivot arm 166 which is mounted to the cylindrical structure of each jack 164 forming a vertical pivot which allows the rake arms 120,130 to rotate about the centerline of the jacks 164 and move in a horizontal plane, to transition between a folded position and an operating position. The rake is illustrated in its transport position in FIG. 5, with the rake arm 120, 130 moved in the horizontal plane, rotating around the centerline of its associated jack 164, so that the outer end is located adjacent to the longitudinal center section 114 of the main frame 110. In the transport position, the outer end of the rake arms 120, 130 are positioned to engage a lift arm 190 which moves the rake arm 120,130 in a vertical plane, rotating around an axis 122, to lift its outside end and flotation wheel 142 off the ground as a lift cylinder 182 is extended.

The folding rake frame 100 is drawn by the tractor 10 via the hitch 112 at the front of the folding rake frame 100. The front of the folding rake frame 100 is defined as the end having the hitch 520. The rear or back of the folding rake frame 100 is defined herein as opposite that of the front. "Forward" is toward the front while "backward" or "rearward" is toward the rear. The term "inner" is defined as "toward the center." "Outer" is defined as away from the center. Inner and outer are relative terms.

The lift cylinder 182 is connected to the main frame 110 and the lift arm 190 on both sides of the main frame 110, as illustrated in FIG. 1. The rear end 192 of the lift arms 190 is configured to engage its respective rake arm 120, 130, in order to raise the rake arm 120,130 to the transport position illustrated in FIG. 5, where the flotation wheels 142 are raised off the ground and the rake is supported by the hitch 112 and the two rear wheels 140.

Figure 5:
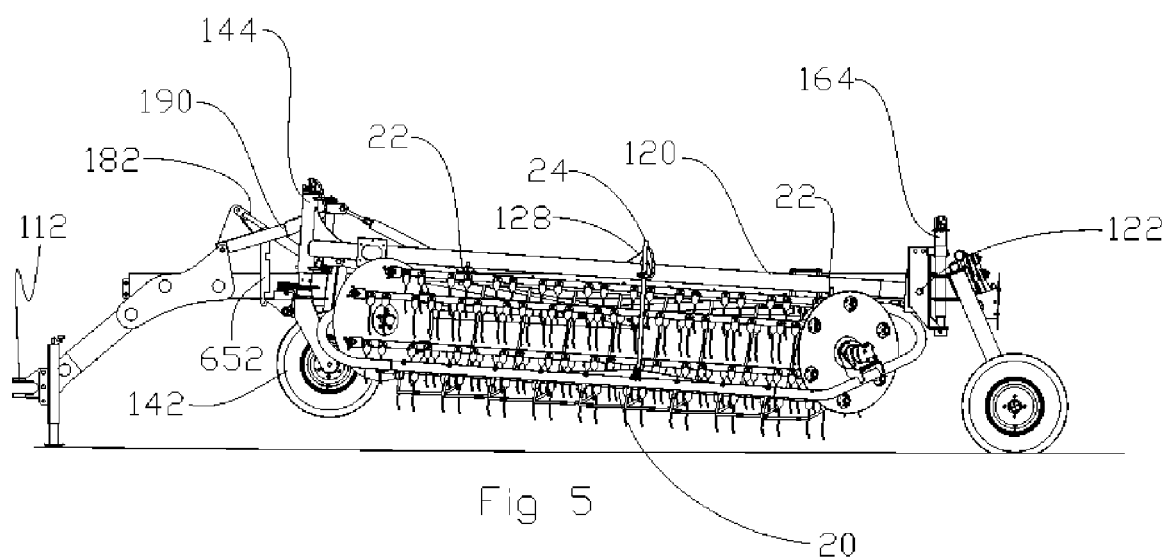
FIG. 5 is a side elevation view with the rake folded into a transport position.

Further illustrated in FIG. 5 is how the rake baskets are supported for transport. The following description focuses on the left rake basket 20. The same arrangement is used for the right rake basket but will not be described. The left rake basket 20 is supported by the rake arm 120 at two basket swing bearings 22. The parallel bar rake basket 20 swings freely on these basket swing bearings 22, and is restrained in its operating position by a height adjust link 24, connected to an arm 128, which holds the basket rake at a fixed position in relation to the rake arm 120.

The rake arm 120 includes an inner end, attached at the pivot point 122. As described earlier, the vertical position of this inner end can be adjusted by the jack 164 to control the height of the inner end of the rake basket 20.

Figure 16:
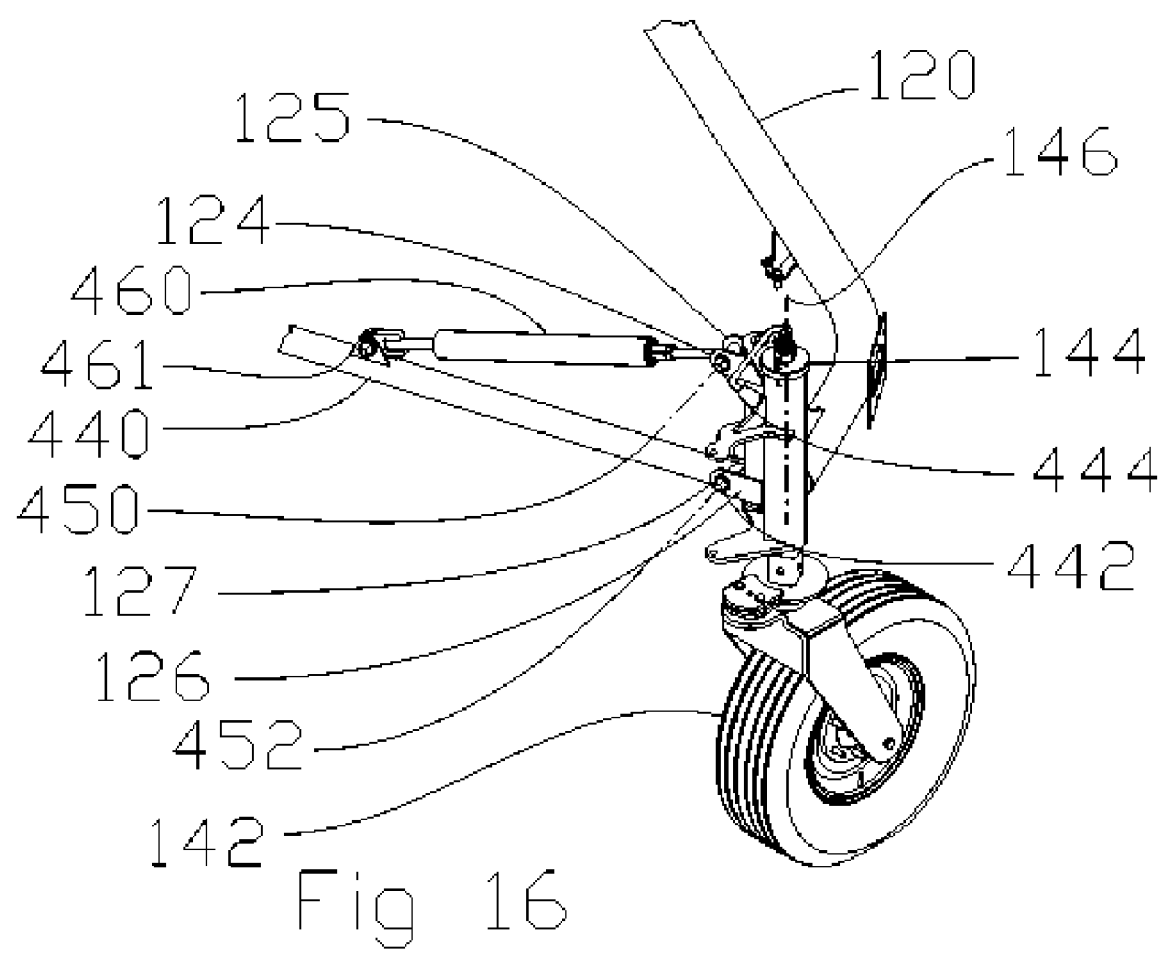
FIG. 16 is a detail view of an outer portion of the rake frame.

In FIG. 16, the flotation wheel 142, mounted at the outer end of the rake arm 120 in the operating position, is illustrated. The flotation wheel 142 is rotationally mounted, in order to freely rotate about a substantially vertical axis 146, to an outer jack 144 that allows the vertical position of the flotation wheel 142 relative to the rake arm 120 to be adjusted in order to control the height of the outer end of the rake arm 120 and subsequently the height of the rake basket 20.

The outer jack 144 and its supporting structure is fixedly connected to the rake arm 120 which includes two pairs of mating ears 124,125 and 126,127 defining the two horizontal pivot axes 450 and 452 located in the vicinity of the jack 144. A bolt 442 passes through the apertures in ears 126-127, and through an aperture in an end of an outer fold arm member 440 that positions this outer end. A bolt 444 passes through apertures in the pair of ears 124,125, and through an aperture in an end of a spring cylinder 460. The spring cylinder 460 is rotationally attached at its opposite end to an outer fold member 440, and includes an internal spring that provides a spring force to the mating ears 124, 125 to stabilize the outer end of the rake arm 120. FIG. 2 illustrates this linkage in two positions, with the left rake arm 120 in a position where the topography rises, and the spring cylinder 460 is in an extended state 464, while the right rake arm 130 is in a position where the topography falls away, and the spring cylinder 560 is in a retracted state 562. In this manner the outer fold members 440, 540 and the spring cylinders 460, 560 are able to provide support to the rake arms 120, 130 while the rake travels over a wide variety of terrain.

Figure 17:
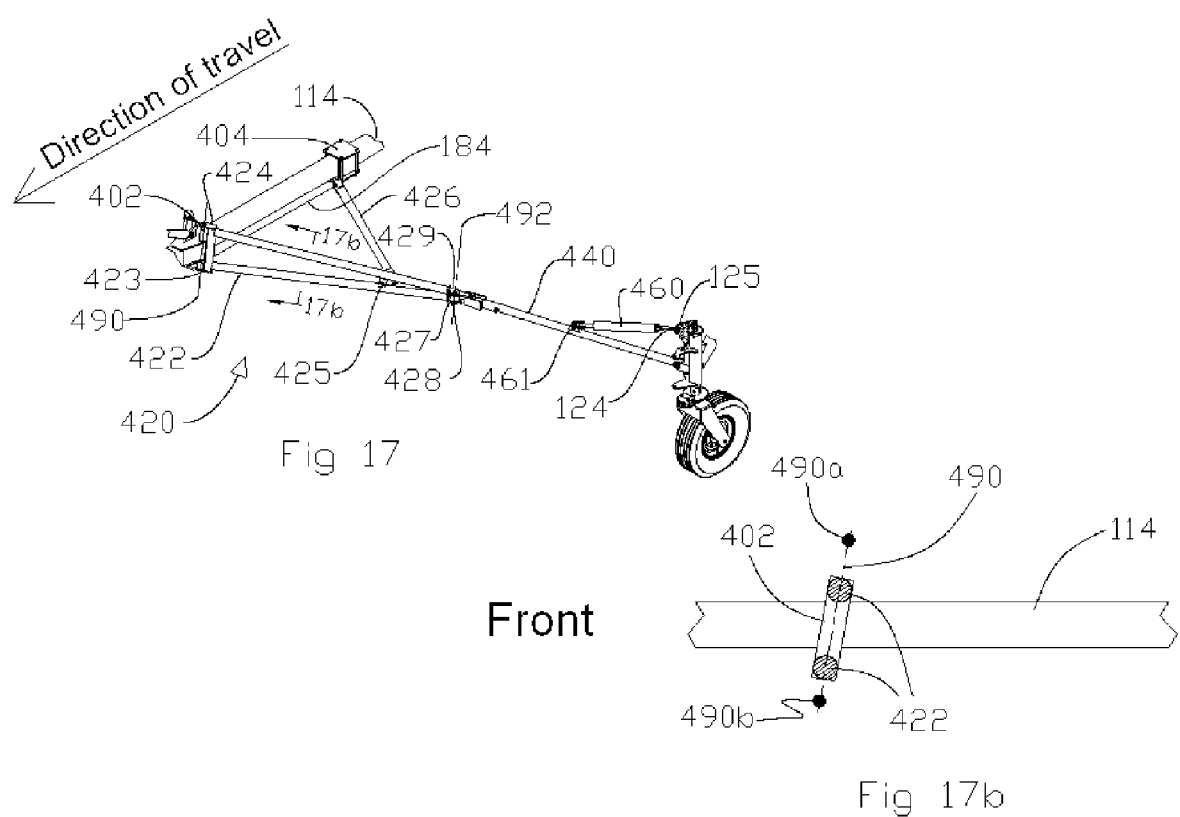
FIG. 17 is detail view of one side section of the rake frame.

The fold linkage of the present invention provides improved support to the outer end of the rake arms 120,130. The following description will describe the fold linkage 400 for the left side. The fold linkage 500 for the right side includes similar components and operates in the same manner. As illustrated in FIG. 4 the fold linkage 400 includes the outer fold arm 440, a middle joint section 430 and an inner fold arm 420. This linkage is illustrated in greater detail in FIG. 17 where the inner fold arm assembly 420 includes a main fold arm 422 mounted to the center section 114 at a pivot tube 402 that is fixedly connected to the center section 114. The main fold arm 422 includes tabs 423, 424 with apertures that are aligned with the axis of the pivot tube 402 to define a first pivot axis 490. The first pivot axis 490 is significantly non-vertical. It lies in a first plane that is vertical and substantially parallel to the center section 114, but the first pivot axis 490 is oriented leaning back somewhat from vertical as clearly shown in FIG. 17b. Hence, a second plane, oriented normal to the vertical first plane and containing the first pivot axis 490 may be defined. Viewing the edge of this second plane as shown in FIG. 17b, it is apparent that any first point 490a lying in the second plane resides behind any second point 490b chosen lower than the first point 490a. This orientation of the first pivot axis 490 affects the vertical position of the outer end 428 of the inner fold arm 420. As the inner fold arm 420 is moved towards the folded position, the outer end will move down; for instance the outer end 428 will be closer to the ground when positioned as shown in solid lines shown in FIG. 10, than it is when positioned as shown in phantom lines in FIG. 10. As the outer end 428 moves lower, the position of the outer fold arm member 440 is affected because it is supported on one end by the outer end 428 of the inner fold arm 420, and on the other end by the ears 126 and 127 of the rake arm 120, which are at a fixed height. As the position of the outer fold arm changes, the position of the first end of the spring cylinder, which attaches at tab 461 changes, as outer end 428 moves lower, so will tab 461. The spring cylinder 460 extends between tab 461 and ears 124, 125. If the ears 124 and 125 remain in a fixed position while tab 461 moves down, the spring cylinder 460 will be stretched to a longer configuration, as allowed by its internal spring, which will result in the generation of a greater spring force being applied to the end of the rake arm 120. The force and orientation of the spring cylinder affects the axis 146. As the rake folds the outer fold member becomes more closely parallel to the rake arm 120, and the force generated by the spring cylinder becomes less effective at positioning the rake arm 120. The orientation of the axis 490 is thus tilted to cause the end 428 of the inner frame 420 and the inner end of the outer fold arm member 440 to move down as the rake folds which tends to generate an increase in the force generated by the spring cylinder 460 that is needed to maintain consistent orientation of the rake arm 120. In this way, the rake baskets 20, 30 are held in a more consistent orientation.

A fold link 426 is rotationally connected to the main fold arm 422 at a tab 425, and rotationally connected to a slider 404. The slider 404 is mounted on the center section 114 of the main frame such that it can slide as cylinder 184 is extended or retracted. As the cylinder 184 is extended the fold link 426 pulls the main fold arm 422 toward the center section 114 of the main frame 110, toward the transport position. As the cylinder 184 is retracted, the fold link 426 pushes the main fold arm 422 out, and into the position illustrated in FIG. 17.

The main fold link 422 includes an outer end 428 comprising an upper tab 429 and a lower tab 427 with apertures that are aligned to define a second pivot axis 492. The second pivot axis 492 is approximately parallel to the first pivot axis 490.

Figure 18:
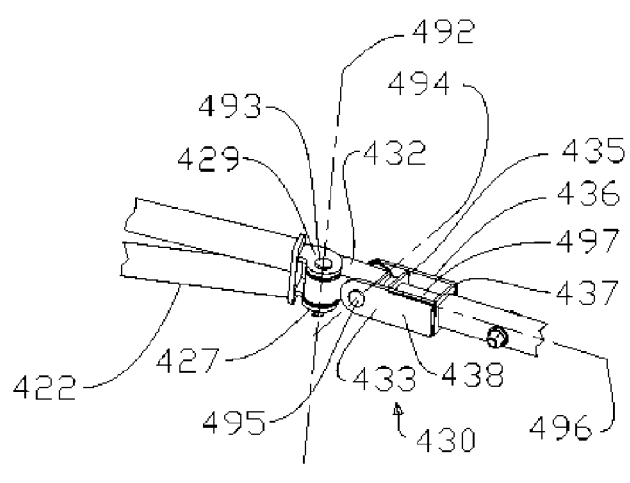
FIG. 18 is a detail view of the middle member of the rake frame.

FIG. 18 illustrates the outer end of the main fold link 422 and the middle joint section 430 in detail, including the second pivot axis 492, a third pivot axis 494 and a fourth pivot axis 496. The middle joint section 430 includes a first end member 432 with an aperture that aligns with the apertures in the tabs 429, 427. A pin 493 passes through the apertures in tabs 429 and 427 and through the aperture in the first end member 432 to define the second pivot joint 492. The first end member 432 further includes a second aperture, with a centerline that defines third pivot axis 494 that is approximately perpendicular to the second pivot axis 492.

A middle member 433 of the center section 430 is configured from two plates 438, 436 with apertures that are aligned with the second aperture of the first end member 432 to define the third pivot axis 494. A pin 495 passes through the plate 438, the second aperture in the first end member 432, and the plate 436 to define the third pivot joint allowing rotation about the third pivot axis 494.

The middle member 433 is further constructed with two additional plates 435, 437 each including apertures that are aligned to define the fourth pivot axis 496. Another pin 510 (see FIG. 19) passes through the apertures in the additional plates 435, 437 to form the fourth pivot joint allowing rotation about the fourth pivot axis 496.

Figure 19:
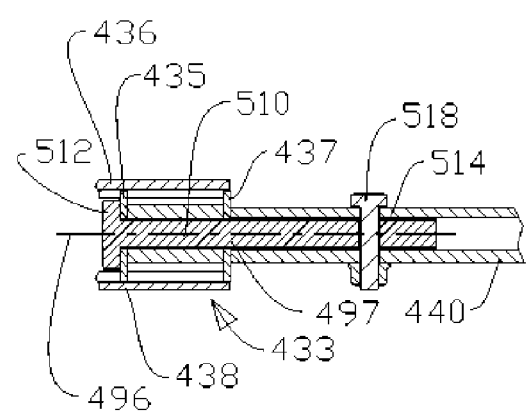
FIG. 19 is a cutaway view of the middle member of the rake frame.

FIG. 19 illustrates the fourth pivot axis 496 in more detail with pin 510 passing through the apertures in plates 435, 437, and including an enlarged section 512 that will not pass through the aperture in the plate 435. In this manner the pin 510 is retained by the middle member 433. The opposite end of the pin 510 includes an aperture 514 that is aligned with an aperture in the outer fold arm 440. A bolt 518 passes through these apertures and is secured by a nut to finalize the assembly of the fold linkage.

Figure 8:
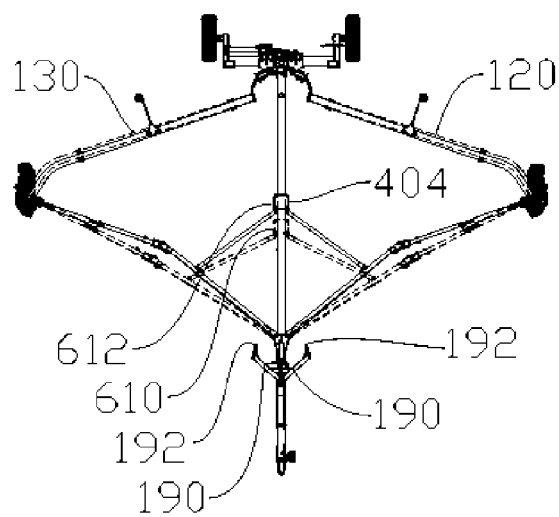
FIG. 8 is a top plan view showing the frame in phantom in the operating position, and also in a position where the fold cylinder is partially extended, one fourth of the stroke of the fold cylinder.

The fold linkages function to rotate the rake arms 120, 130 between an operating position and a transport position, as illustrated in FIGS. 8 through 12. FIG. 8 illustrates the folding frame 100 in two positions, a first, operating position shown in phantom with the slider 404 in a first position 610, and a second position with the rake arms 120, 130 in a partially retracted position with the slider 404 in a second position 612 wherein the two positions 610, 612 are spaced apart a distance equal to approximately one-fourth of the stroke of the fold cylinder 184. It is apparent that during this initial movement of the slider 404 the rake arms 120, 130 begin to move toward the transport position.

Figure 9:
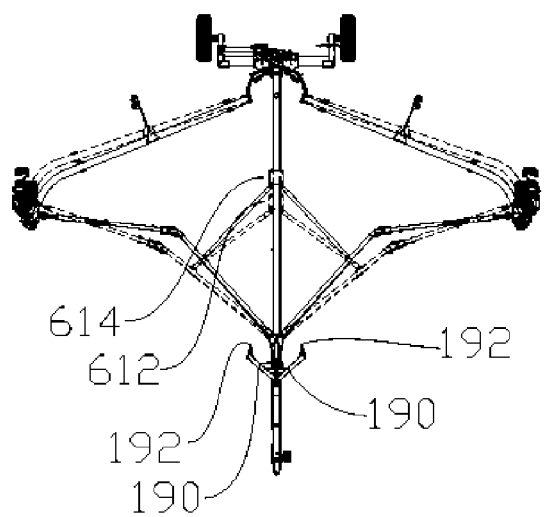
FIG. 9 is a top plan view showing the frame in phantom in a position where the fold cylinder is one fourth extended, and also in a position where the fold cylinder is one half extended.

FIG. 9 illustrates the folding frame 100 in the second position, shown in phantom with the slider in the second position 612, and in a third position with the slider in a third position 614. Between the second and third positions 612, 614, the slider is spaced apart by a distance equal to the distance between first position 610 and the second position 612. It is apparent that during this second range of travel of the slider 404 that the rake arms 120, 130 move further yet toward the transport position.

With the slider 404 moving at a constant speed the speed at which the rake arms 120, 130 move toward the transport position will increase, as is further demonstrated by FIGS. 10 and 12 where the rake is shown with the slider at a third position 614, a fourth position 616, and a fifth position 618, each spaced apart an equal distance from the previous position. It is apparent that the rake arms move significantly further as the slider 404 moves from the fourth position 616 to the fifth position 618, than when slider moves from the third position 614 to the fourth position 616.

Figure 20A:
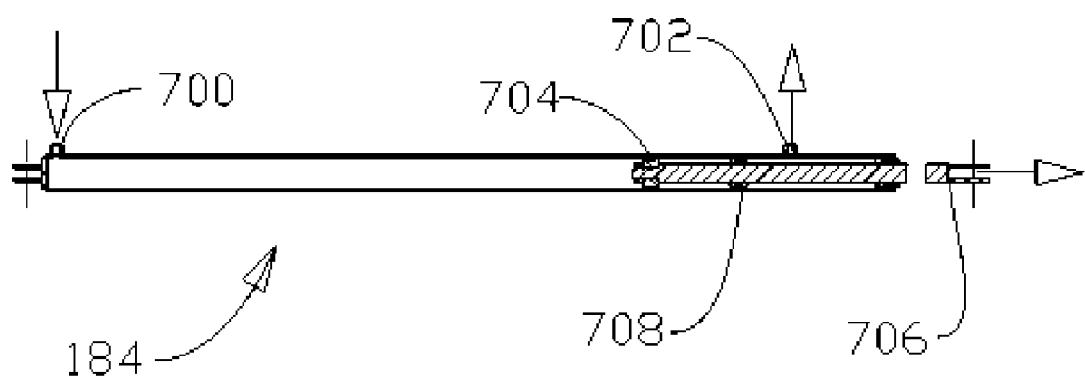
FIG. 20*a* is a first cross-sectional view of the cushion fold cylinder.
Figure 20B:
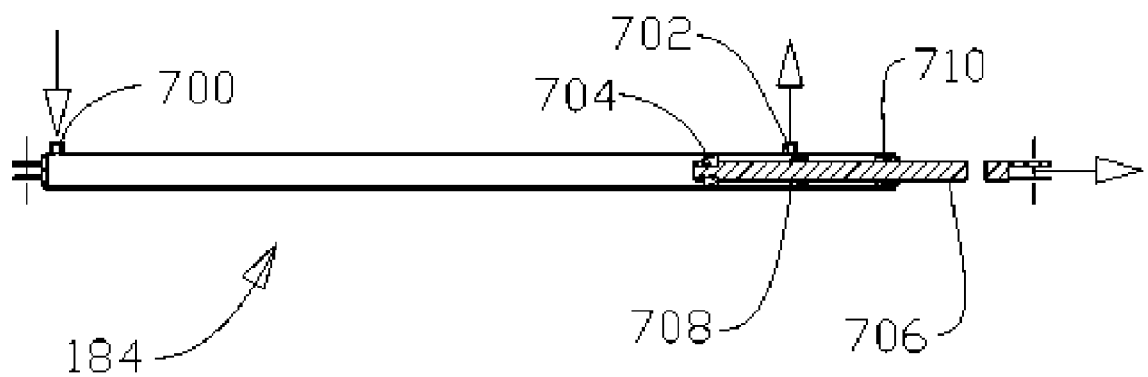
FIG. 20*b* is a second cross-sectional view of the cushion fold cylinder.

Due to this acceleration, it is desirable to reduce the speed at which the fold cylinder 184 travels toward the end of its extension in order to reduce the speed at which the rake arms 120, 130 fold. The folding frame 100 of the present invention uses a fold cylinder 184 with a cushion feature, as illustrated in FIGS. 20a and 20b. A port 700, 702 on each end allows oil to be pumped into the cylinder 184 or allows oil to flow out of the cylinder 184, depending on whether it is being extended or retracted. Oil pumped into a butt-end port 700 will create a differential pressure across a piston 704 forcing the cylinder 184 to extend. As long as oil is allowed to flow freely out of the rod-end port 702, the rate at which the cylinder 184 extends will be limited by the rate at which oil is pumped into the butt-end port 700. In the configuration illustrated in FIG. 20a, there is no restriction to the oil flowing out of the rod-end port 702.

As the piston 704 and the rod 706 move to the right, extending the cylinder 184, a secondary piston 708 also moves, and eventually reaches the position shown in FIG. 20b, where the secondary piston 708 is beyond the rod-end port 702. In this position the oil between the secondary piston 708 and the cylinder gland 710 is trapped, and must pass across the secondary piston 708 in order to flow out of the rod-end port 702. The secondary piston 708 can be configured to provide restriction to this flow of oil, which results in restriction to the movement of the rod 706, and will slow the extension of the cylinder 184.

The location of either the rod-end port 702 or the secondary piston 708 can be adjusted to vary how far the cylinder 184 extends with no flow restriction. The folding cylinder 184 is configured such that the start of the restricted cylinder travel occurs between the fourth position 616 and the fifth position 618 of the slider 404. The resulting restricted speed of travel of the cylinder 184 provides improved function of the fold by reducing the speed of the rake arms 120, 130, reducing the impact that occurs when the arms 120, 130 reach the transport position.

Figure 13A:
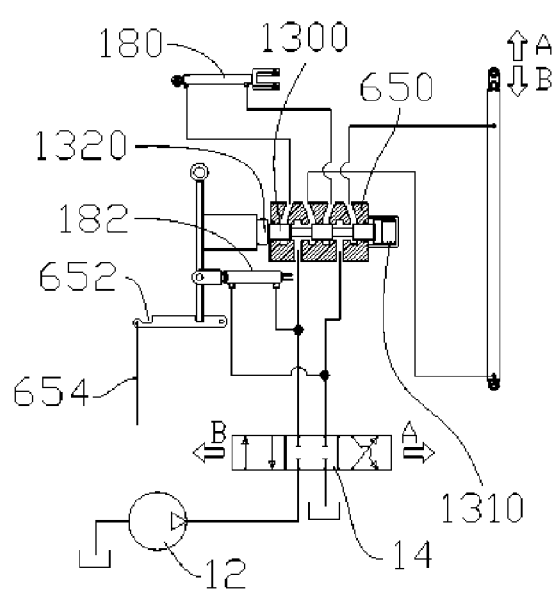
FIG. 13a is a hydraulic schematic showing the fold cylinder, windrow width cylinder, transport lift cylinder, and the valve that coordinates these functions.
Figure 13B:
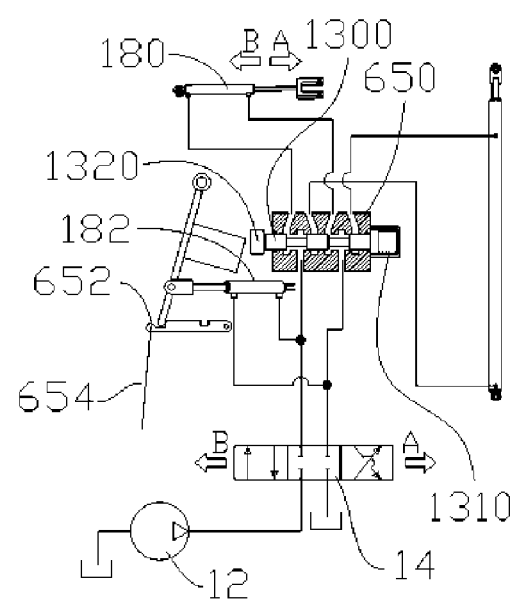
FIG. 13b is a hydraulic schematic showing the lift cylinder in an extended position.

The start of the restricted travel also provides a variation in the hydraulic characteristics that is useful in providing a sequencing signal, when used in combination with the hydraulic circuit illustrated in FIGS. 13a and 13b, which includes the hydraulic pump 12 and a control valve 14 generically representing a tractor 10. The hydraulic circuit further includes a selector valve 650, the lift cylinder 182, the windrow width cylinder 180 and the fold cylinder 184, all connected to a single control valve 14. The selector valve 650 allows all the functions of the folding frame 100 to be controlled with this single control valve 14 on the tractor.

The lift cylinder 182 mechanically controls the position of the selector valve 650 between two primary positions by causing the lift arm 190 to engage an end 1320 of the spool 1300. A first position of the selector valve 650 is illustrated in FIG. 13a, where the spool 1300 is mechanically shifted to the right, when the lift cylinder 182 is fully retracted. A second position of the selector valve 650 is illustrated in FIG. 13b, where the spool 1300 shifted to the left by the force of an internal spring 1310 when the lift cylinder 182 is in any position other than completely retracted. The lift cylinder 182 is controlled independently of the position of the selector valve 650 by the tractor's hydraulic system because the lift cylinder 182 is connected in parallel to the hydraulic lines supplying oil to the selector valve 650. Additionally, a mechanical lock 652, a generic representation illustrated in FIG. 13a including a linkage 654 that allows the operator of the tractor 10 to control the mechanical lock 652 from the tractor seat, is used to lock the lift cylinder 182 in either of two positions. With both the hydraulic valve 14 and the mechanical lock 652, the operator can control the lift cylinder 182, either locking it in the completely retracted position, by allowing the mechanical lock 652 to limit the stroke or allowing it to extend, by using the linkage 654 to release the mechanical lock 652.

The spool end 1320 is preferably covered with a protective, elastic material, such as rubber. However, the present invention is not limited thereto.

With the lift cylinder 182 locked in its fully retracted position and the selector valve 650 mechanically shifted as shown in FIG. 13a, the hydraulic circuit operates to actuate the fold cylinder 184, as would be used to move the rake arms 120, 130 from the operating position, as shown in phantom in FIG. 8, to the transport position shown in FIG. 12. With the lift cylinder 182 locked in its fully extended position and the selector valve 650 mechanically shifted as shown in FIG. 13b, the hydraulic circuit operates to actuate the windrow width cylinder 180. The windrow width cylinder 180 must be fully extended to separate the inner ends of the rake arms 120, 130 during folding to avoid interference as the rake arms 120, 130 move to their transport positions.

Figure 21A:
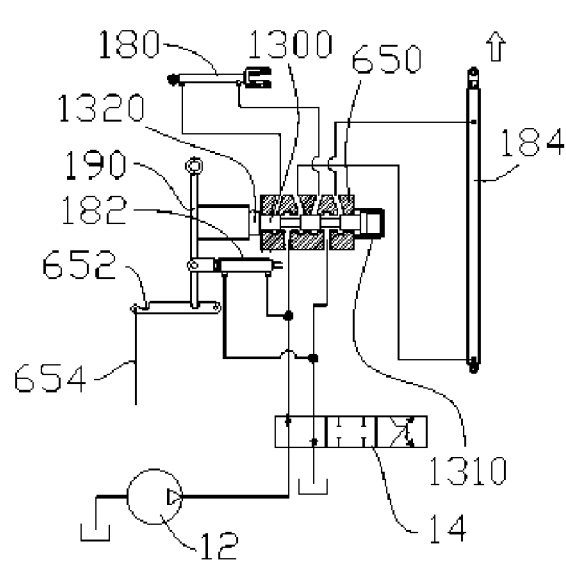
FIG. 21*a* is a hydraulic schematic showing the selector valve in position such that the fold cylinder is actuated.
Figure 21B:
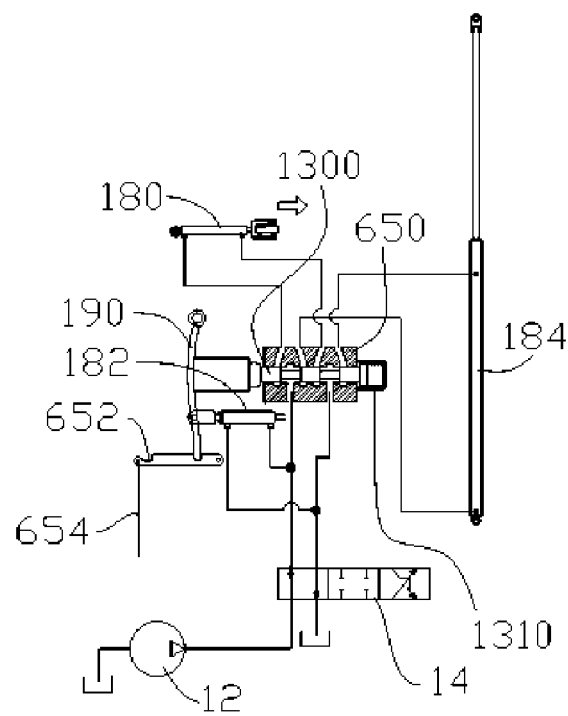
FIG. 21*b* is a hydraulic schematic showing the selector valve in position such that either the fold cylinder or the windrow width cylinder may be actuated.

The hydraulic circuit, including the selector valve 650 combined with the cushion fold cylinder 184, provides automatic coordination of the movements of the fold cylinder 184 and the windrow width cylinder 180. As the fold cylinder 184 approaches its fully extended position as depicted in FIG. 20b, the flow through the fold cylinder becomes noticeably restricted. Therefore, the pressure in the hydraulic circuit, shown in FIGS. 21a and 21b, rises, shifting the lift cylinder 182 slightly due to tolerances and the small elasticity of the mechanical lock 652 and other components. The shifted position of the lift cylinder 182 is shown in FIG. 21b. In the shifted position, the force on the spool 1300 from the lift arm 190 due to the lift cylinder 182 is decreased, hence, the spool 1300 shifts slightly to the left according to the orientation of FIGS. 21a and 21b. The lift arm 190 depicted in FIG. 21b is shown in a strained position due to the extra force from the lift cylinder 182. By careful adjustment of the bumper 2210 that connects with the lift arm 190 as shown in FIG. 22a, some of all four ports in the selector valve 650 may be made to be open to flow. Thus, both the windrow width cylinder 180 and the fold cylinder 184 may be manipulated. In actuality, the cylinder 180, 184 that actuates is the one providing the path of least resistance to flow. With the fold cylinder 184 in its cushion mode, the resistance to flow through the fold cylinder 184 is high. Therefore, under normal conditions, the windrow width cylinder 180 will actuate to its extended position, widening the windrow width to its maximum width. In this position, the rake arms 120, 130 will not collide with the center section 114. Once the windrow width cylinder 180 has reached its full extension, the path of least resistance to flow becomes the path through the fold cylinder 184. This will result in the completion of the transition to transport mode, but the rake arms 120, 130 will travel more slowly than before, reducing the impact of the rake arms 120, 130 to the center section 114.

The adjustment alluded to above providing flow to all four ports shown in FIGS. 13a, 13b, and 21-22 is made easier by the shape of either the ports or the spool 1300, depending on the make and model of the selector valve 650. In FIG. 22b, notches 2200 have been cast into the sides of the ports, providing a gradual change in flow as the spool 1300 moves to either open or close a port. These notches 2200 also effectively provide a finite region in which flow may pass the spool 1300 to all four ports.

The above describes an embodiment in which there are two primary positions of the selector valve 650:

with the flow path open to the windrow width cylinder 180 only, and with the flow path open to the fold cylinder 184 only, and an intermediate position with the flow paths open to both the windrow width cylinder 180 and the fold cylinder 184. Hence three positions of the selector valve 650 are used regularly.

In an additional embodiment, only two positions of the selector valve 650 may be used:

with the flow path open to the windrow width cylinder 180 only, and with the flow paths to both the windrow width cylinder 180 and the fold cylinder 184. In this embodiment, during folding, the cylinder 180, 184 presenting the path of least resistance will be the cylinder to be actuated at a given time. Under typical conditions, the first cylinder 180, 184 to actuate upon initiation of the folding of the folding rake frame 100 is the fold cylinder 184. The fold cylinder 184 will continue to actuate until it reaches its cushion mode. At this point, the resistance to flow through the fold cylinder 184 becomes significantly restricted and the path of least resistance becomes the path through the windrow width cylinder 180. After the windrow width cylinder 180 has reached the end of its travel, it no longer presents a flow path. Therefore, the fold cylinder 184 continues to be actuated in its cushion mode until it reaches the full extent of its travel. As in the previous embodiment, the lift arm 190 is used to actuate the selector valve 650 and is locked in place by the mechanical lock 652 in either primary position.

Although many of the figures and description have been for a basket rake, the folding frame 100 of the present invention is not limited thereto. Other implements such as cultivators, listers, planters, etc. may be constructed using the same method and apparatus described herein.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

What is claimed is:

1. A toolbar including a fold arm comprising:
   (a) a first section, including an inner end operatively, pivotally connected at a substantially vertical first pivot axis to a main frame, and an outer end;
   (b) a second section, including a first pivot joint, operatively, pivotally attached to the outer end of the first section at a second substantially vertical pivot axis, a second pivot joint, pivotal about a substantially horizontal third pivot axis, and a third pivot joint;
   (c) a third section including a fixed length element operatively, pivotally attached at a first end to the third pivot joint of the second section, said third pivot joint pivotal about a substantially horizontal fourth pivot axis oriented in alignment with a longitudinal axis of said third section;
   (d) a tool frame to which a second end of the third section is operatively pivotally attached at a substantially horizontal fifth pivot axis, said tool frame comprising a substantially vertical fifth pivot joint, a top end, and a bottom end; and
   (e) a variable length fourth section, operatively, pivotally attached at an inner end to the third section and at an outer end to the top end to the tool frame.

2. A folding implement toolbar having a front and a back, said folding implement toolbar comprising:
   (a) a wing;
   (b) a center section to which the wing is operatively, pivotally attached;
   (c) an inner fold arm operatively, pivotally attached to the center section;
   (d) an outer fold arm, an inner end of which is operatively pivotally attached to an outer end of the inner fold arm, and an outer end of the outer fold arm being operatively, pivotally attached to the wing; and
   (e) a pivot axis for the pivotal attachment between the inner fold arm and the center section, said pivot axis lying in a first, vertical plane parallel to the center section and in a second plane wherein any first point is behind any second point beneath any of said first points, all first and second points residing in the second plane.

3. The folding implement toolbar of claim 2 additionally comprising:
   (a) a lift arm including an end operatively engagable to the wing; and
   (b) a lift cylinder, operatively pivotally attached to the lift arm and providing a force by which to lift the wing for transport.

* * * * *